(12) United States Patent
Kurth et al.

(10) Patent No.: US 11,692,773 B2
(45) Date of Patent: Jul. 4, 2023

(54) BATTERY PLATE GRID DRYER SYSTEM AND METHOD

(71) Applicant: MAC ENGINEERING AND EQUIPMENT COMPANY, INC., Benton Harbor, MI (US)

(72) Inventors: Robin R. Kurth, St. Joseph, MI (US); Peter D. Imach, St. Joseph, MI (US)

(73) Assignee: MAC Engineering and Equipment Company, Inc., Benton Harbor, MI (US)

( * ) Notice: Subject to any disclaimer, the term of this patent is extended or adjusted under 35 U.S.C. 154(b) by 68 days.

(21) Appl. No.: 17/220,580

(22) Filed: Apr. 1, 2021

(65) Prior Publication Data
US 2021/0318063 A1    Oct. 14, 2021

Related U.S. Application Data

(60) Provisional application No. 63/007,762, filed on Apr. 9, 2020.

(51) Int. Cl.
*F26B 3/02* (2006.01)
*F26B 15/12* (2006.01)
*F26B 3/20* (2006.01)
*F26B 15/18* (2006.01)
*F26B 3/04* (2006.01)

(52) U.S. Cl.
CPC .................. *F26B 3/02* (2013.01); *F26B 3/04* (2013.01); *F26B 3/20* (2013.01); *F26B 15/122* (2013.01); *F26B 15/18* (2013.01)

(58) Field of Classification Search
CPC ...... F26B 3/02; F26B 3/04; F26B 3/20; F26B 15/122; F26B 15/18; F26B 3/18; F26B 21/02; F26B 23/04; F26B 23/06; F26B 23/10
See application file for complete search history.

(56) References Cited

U.S. PATENT DOCUMENTS 8,533,973 B2   9/2013   Ulrich et al.

FOREIGN PATENT DOCUMENTS

JP   59029371 A   *  2/1984   .............. H01M 4/21
JP   2015207523 A  * 11/2015

OTHER PUBLICATIONS

English Translation, JP-2015207523-A, Fujji et al. Nov. 2015 (Year: 2015).*

* cited by examiner

*Primary Examiner* — Jessica Yuen
(74) *Attorney, Agent, or Firm* — Barnes & Thornburg LLP (57) ABSTRACT

A system for drying a battery plate grid is disclosed. The system includes a pair of heated rollers disposed adjacent to one another, and a conveyor belt arranged to transfer the battery plate grids toward the heated rollers, such that the battery plate grid passes between, and comes in contact with, each of the heated rollers. The system includes a convection oven arranged to circulate convection heat around the battery plate grid when the battery plate grid completes transfer through the heated rollers.

20 Claims, 4 Drawing Sheets

BATTERY PLATE GRID DRYER SYSTEM AND METHOD

CROSS-REFERENCE TO RELATED APPLICATIONS

This Utility application is claims the benefit of priority under 35 U.S.C. § 119(e) to U.S. Provisional Patent Application No. 63/007,762, filed Apr. 9, 2020. The disclosure set forth in the above-referenced application is incorporated herein by reference in its entirety.

TECHNICAL FIELD

The present disclosure relates, generally, to a battery plate grid dryer system and, more particularly, to systems and methods for drying battery plate grids using a combination of controllably heated roller and controlled convection heating and accomplishing these improvements within a smaller operating footprint and more energy efficiently.

BACKGROUND

A battery manufacture process may include casting of a battery plate grid, mixing of a grid paste, application of the paste to the grid casting, followed by a curing and/or drying phase. A cured or dried battery plate grid may then go through a formation followed by washing and drying and cutting and brushing stages. The battery plate grid may then be incorporated into a larger battery assembly that may undergo activation to become fully operational.

A battery plate grid dryer system design and operation can greatly influence quality, longevity, and durability of battery plates. Accordingly, to be effective, a battery plate grid dryer system needs to be able to controllably remove moisture from the paste which is embedded in the plate grid openings as quickly and efficiently as possible without compromising structure and effectiveness of the resulting battery plates.

As an additional matter, manufacturing space associated with battery plate grid production needs to the managed and controlled. Not only is the square footage in a manufacturing operation managed to optimize profit, there may be environmental regulation concerns that suggest minimizing the footprint or square footage used by various processing equipment. The environmental regulations may require the capturing and filtration of various atmospheres surrounding processing equipment. In addition, minimizing the footprint can also minimize the space and time between the drying operation and a subsequent operation thereby also reducing exposure of the plates being processed through the dryer to the ambient atmosphere and thereby improving compliance with environmental regulations.

SUMMARY

A system for drying a battery plate grid includes a heated rollers portion directly connected to a convection oven portion. The heated rollers portion includes at least one pair of heated rollers disposed adjacent to one another and spaced apart to define a passage therebetween, and a first conveyor belt arranged upstream from the heated rollers and a first portion of a second conveyor belt arranged downstream from the heated rollers. The heated rollers are configured to receive the battery plate grid from the first conveyor belt and movably transfer the battery plate grid, via the passage, to the second conveyor belt. The heated rollers are disposed to interfere with a surface of a paste applied to a surface of the battery plate grid to remove moisture from the surface of the paste. The convection oven portion includes a convection oven configured to house a second portion of the second conveyor belt. The second conveyor belt is arranged to movably transfer the battery plate grid from the outlet of the heated rollers portion to an inlet of the convection oven and along a length of the convection oven toward an outlet of the convection oven. The convection oven is configured to apply convection heat to the surface of the paste on the battery plate grid to remove moisture from the surface of the paste.

A method for drying a battery plate grid includes movably transferring, using a first conveyor belt, the battery plate grid toward at least one pair of heated rollers arranged adjacent to one another and spaced apart to define a passage therebetween, wherein a surface of the battery plate grid includes a paste applied to two sides of the battery plate grid, and wherein the two sides oppose one another, movably transferring the battery plate grid, via the passage, to the second conveyor belt, wherein each of the heated rollers is disposed to interfere with a surface of the paste of the battery plate grid to remove moisture from the surface of the paste, movably transferring, using the second conveyor belt, the battery plate grid to a convection oven directly connected to a portion that houses the heated rollers, and movably transferring, using the second conveyor belt, the battery plate grid from an inlet of the convection oven and along a length of the convection oven toward the outlet of the convection oven to expose the surface of the paste to convection heat to remove moisture from the surface of the paste.

A system for drying a battery plate grid includes a housing including a first conveyor belt, a second conveyor belt spaced apart from the first conveyor belt, a pair of heated rollers disposed between the first and second conveyor belts, wherein the heated rollers are configured to receive the battery plate grid from the first conveyor belt and movably transfer the battery plate grid to the second conveyor belt, wherein the heated rollers are disposed to come in contact with a surface of paste applied to two opposing sides of the battery plate grid to remove moisture from the surface of the paste, and a convection air circulating device configured to, while the second conveyor belt movably transfers the pasted battery plate grid through interior of the housing, circulate air over the surface of the paste to remove moisture therefrom.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

An example battery plate grid dryer system of the present disclosure may include a pair of rollers, e.g., an upper roller being paired with a corresponding lower roller. The pairs of rollers may be heated and may be arranged to movably receive a battery plate grid therebetween. In an example, the rollers may be arranged to contact a pasted strip exterior of the battery plate grid to dry the paste. Further, the pair of rollers may move the battery plate grid along to a next stage of a battery manufacturing and/or assembly process. In some instances, the pair of rollers may include a thermal fluid heating system to increase heat transfer to the strip. Heating of the roller portion with thermal fluid may provide sufficiently controllable and controllably consistent heat density to accomplish the desired heat transfer results at an early stage of the manufacturing process. Additionally or alternatively, the rollers may be heated using an electrical heating system that includes, for example, one or more heater cartridges or resistance coils wound around a ceramic core. Other implementations for heating the rollers are also contemplated.

An example battery plate grid dryer system of the present disclosure may be configured to implement at least a portion of the drying process using controllable convection air current heating. Thus, upon completion of the heating of the pasted battery plate grid by the pair of rollers, the rollers may be configured to deliver the battery plate grid to a convection heating area for additional controlled moisture removal and drying. Accordingly, the convection portion of the dryer system may enhance the removal of moisture from the battery plate grid to help controllably dry the strip faster and more efficiently. The convection portion of the dryer system may be approximately 8-10 feet long and may provide heated air in a contained environment.

Figure 1:
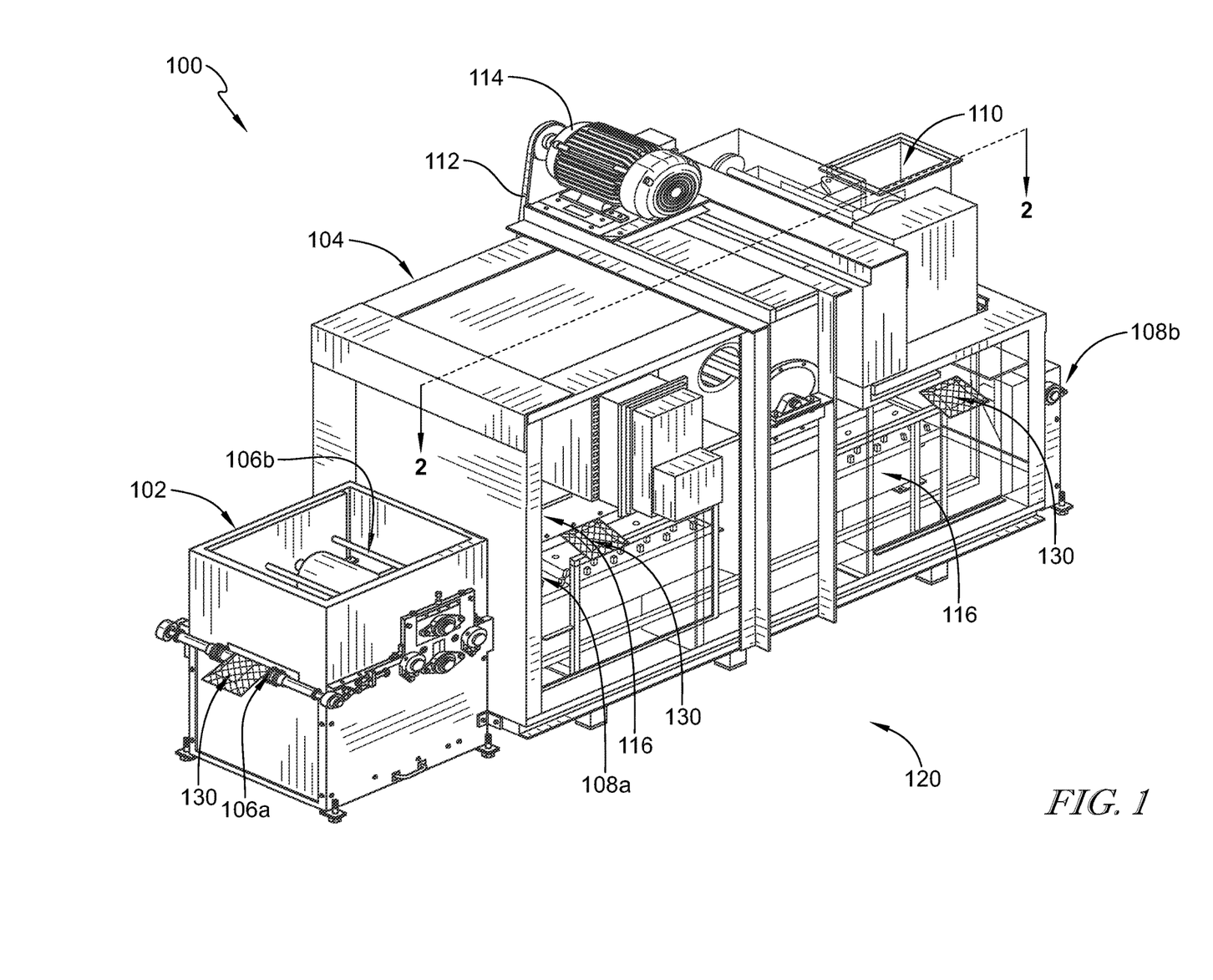
FIG. 1 is diagram illustrating a perspective view of a battery plate grid dryer system.
Figure 2:
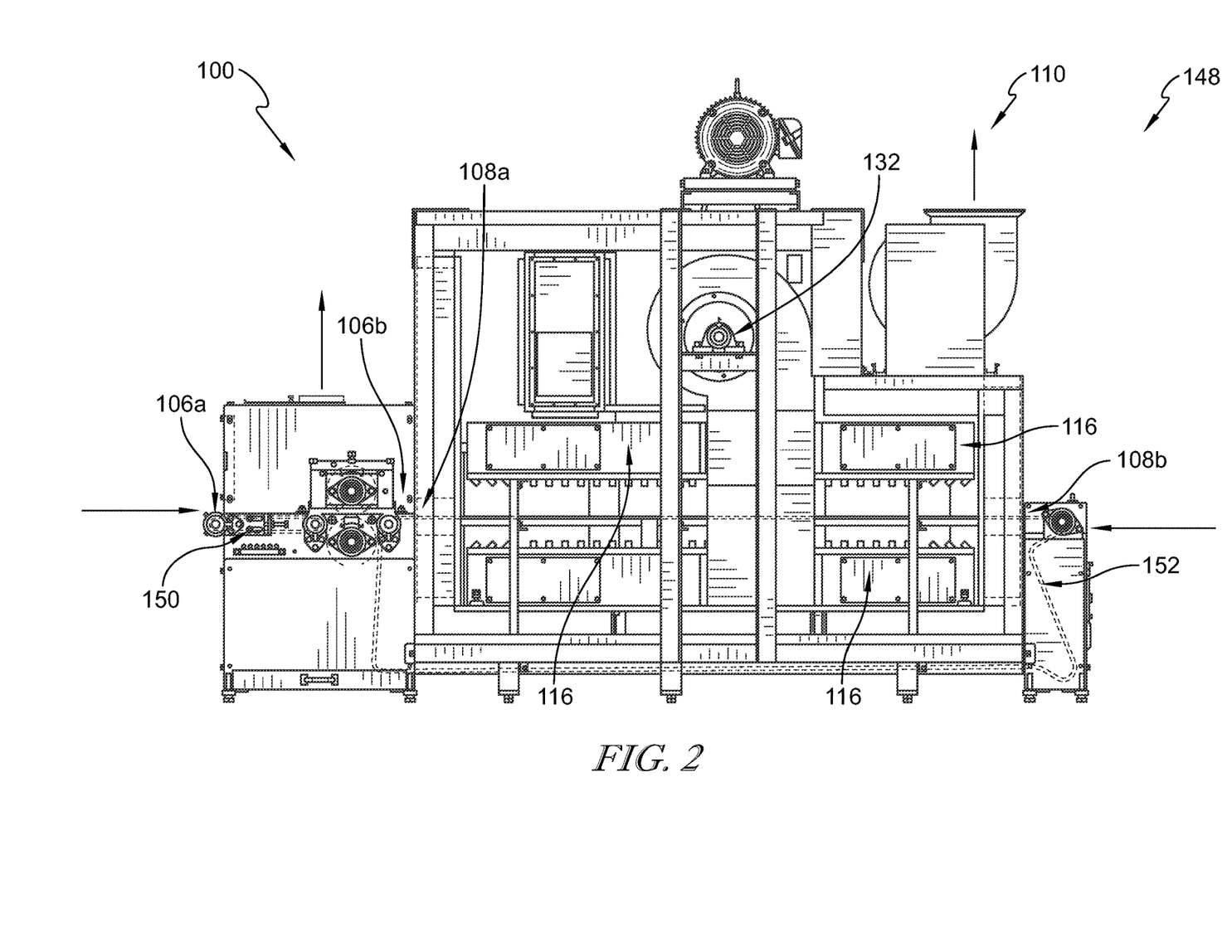
FIG. 2 is a diagram illustrating a cross-sectional view of the battery plate grid dryer system taken along line 2-2 in FIG. 1.

FIGS. 1 and 2 illustrate views 120 and 148, respectively, of an example battery plate grid dryer system 100. FIG. 1 illustrates a perspective view 120 of a battery plate grid dryer system 100 and FIG. 2 illustrates a cross-sectional view 148 of the battery plate grid dryer system 100 taken along line 2-2 in FIG. 1. The system 100 includes a heated roller portion 102 and a convection air heating portion 104 and may be configured to remove moisture from, i.e., to dry and/or cure, at least a portion of a battery plate grid 130. The battery plate grid 130 may enter the system 100 through an inlet 106a of the heated roller portion 102 and may exit the system 100 through an outlet 108b of the convection air heating portion 104. While the heated roller portion 102 and the convection air heating portion 104 are illustrated as separate units, it is also contemplated that the portions 102, 104 may be fully or partly combined. For example, the convection air heating portion 104 may comprise, in whole or in part, the heated roller portion 102 and vice versa. As another example, a housing may comprise a heated roller portion 102 and a convection air circulation device disposed downstream from the heated roller portion 102.

The battery plate grid 130 being dried by the system 100 may have been previously formed or cast during one or more stages of a battery manufacturing process. In one example, the battery plate grid 130 may be one of a cast grid or a portion of a continuous grid. Other methods for forming, casting, or otherwise manufacturing the battery plate grid 130 are also contemplated.

It is envisioned that a variety of input processing equipment and output processing equipment can be attached to the respective ends of the present system 100. In this regard, the relatively small footprint of the present invention helps to provide flexibility in accommodating a variety of process configurations. By reducing the size of the footprint the manufacturer can accommodate a more flexible manufacturing facility layout. In addition, the footprint of the present invention is approximately 50 percent smaller than similar processing equipment prior to the development of the present invention. The reduction in the footprint is due to reducing the number of rollers at the input end of the system to only two rollers as well as by increasing the control of the processing through the dryer oven portion of the system. The number of rollers can be reduced to two by improving the heating consistency and efficiency through the use of a fluid heat-transfer medium associated with each roller instead of an electronic heat-transfer system of the prior art. The fluid heat-transfer system improves the controllability and increases the heat transfer density and consistency thereby making it much more efficient. The use of only a single pair of rollers also provides the mechanical and other processing benefits set forth herein.

On the output side of the system 100, the smaller footprint may allow for better ambient atmosphere processing, reduced exposure to the atmosphere, and the accommodation of cooperative automation. In this regard, reducing the footprint allows the placement of a robotic or other material handling system to controllably and consistently handle the output of the system. This can help reduce the exposure by a human operator to the processing conditions associated with the ambient atmosphere at the output end of the dryer. Such a robotic or other automated material handling system requires an operating envelope for safety purposes and requires some space for its own footprint. As such, by reducing the footprint of the system, additional efficiency can be designed into the overall system by adding robotic or other material handling automation proximate to the output of the system 100.

In addition to improving the heat transfer portion of the input and the number of rollers, the controllable convection oven portion 104 is reduced in size by increasing the flow of air through the oven, increasing the insulation of the oven containment area and increasing the control and monitoring of the moisture content of the plates before and after treatment in the oven. The increased airflow withdrawal from the oven is produced in order to create a negative pressure within the oven, drawing atmosphere into the oven through the input opening and preventing a positive pressurization of the oven. This allows the system to control the flow of atmosphere through the oven for better regulatory containment. At the output end of the oven, atmosphere is collected for appropriate regulatory processing, thereby enhancing the benefits of this system.

The system 100 includes a first conveyor belt 150 and a second conveyor belt 152. In one example, the first conveyor belt 150 is configured to movably transfer the battery plate grid 130 from the inlet 106a of the heated roller portion 102 toward the second conveyor belt 152. As will be described in reference to at least FIG. 3, the first conveyor belt 150 may deliver the battery plate grid 130 to a pair of heated rollers 214 and 230 that, in turn, may be configured to movably transfer the battery plate grid 130 to the second conveyor belt 152 for further processing. A first portion of the second conveyor belt 152 may be housed within the heated roller portion 102 and a second portion of the second conveyor belt 152 may be housed within the convection air heating portion 104. The second conveyor belt 152 is configured to movably transfer the battery plate grid 130 from the heated roller portion 102 to the convection air heating portion 104, such as via a corresponding one of an outlet 106b of the heated roller portion 102 and an inlet 108a of the convection air heating portion 104. The second conveyor belt 152 may be further configured to movably transfer the battery plate grid 130 along a length of the convection air heating portion 104 and toward the outlet 108b of the convection air heating portion 104, where the grid paste drying phase of the battery plate manufacturing may end.

In an example, the system 100 may be configured to remove moisture from battery plate grid 130 that have been freshly pasted. Thus, the battery plate grid 130 may enter the system 100 immediately following the pasting phase of the battery plate manufacturing process.

Battery plate paste may comprise an acid that causes the paste to cure, i.e., harden, without the assistance of heat or moisture removal process. Such self-curing of the paste may change physical structure of the paste material and may interfere with a proper drying process and may have undesired effects on surface durability of the plate. In some instances, pressure of the rollers applied to such hardened paste to extract moisture may crush the structure of the paste.

On the other hand, a fresh paste has a different structure from that of the hardened paste and may be described as a mud-like substance. Indeed, the viscosity of the fresh paste is carefully maintained to allow the paste to be applied to the battery plate grid 130. However, even a passage of just a few hours may cause the viscosity of the applied paste to increase such that the paste enters a viscoelastic state that eventually culminates in a solid state.

As illustrated in FIG. 2, the convection air heating portion 104 of the system 100 includes a duct system 116 defining a plurality of openings, such as air inlets, exhaust outlets 110, and vents, through which heat is circulated by a recirculation fan 132 that may, for example, be belt-driven 112 by a blower motor 114. The recirculation fan 132 of the convection air heating portion 104 may be configured to maintain relatively constant distribution of the heat within the portion 104 to promote even moisture distribution throughout the paste on a surface of the battery plate grid 130 and to promote adhesion between the paste and the grid surface. The convection air heating portion 104 of the system 100 may be either electrically or gas-heated.

The convection air heating portion 104 may further include one or more combustion components, such as burners, flame rods, regulators, igniters, and pressure switches, one or more conveyor elements, such as conveyor belts, chains, and associated hardware, and one or more electrical components, such as, but not limited to, fuses, relays, switches, and controllers. In some instances, the convection air heating portion 104 may include one or more pumps, valves, nozzles, and pipes for precisely directing, evenly circulating and distributing the heat throughout interior portion of a housing of the convection air heating portion 104. Furthermore, insulated panels and other components may ensure achievement of a predefined (required) level of operating efficiency for the convection air heating portion 104.

As discussed above, at least one exemplary system 100 includes an outer housing within which the portions 102, 104 are fully or partly combined. For example, within a shared outer housing, the convection air circulation device (e.g., the device comprising one or more components described with respect to the convection air heating portion 104) may be disposed with respect to the heated rollers 214 and 230, such that, while the second conveyor belt 152 transfers the battery plate grid 130 through interior of the shared outer housing and away from the heated rollers 214 and 230, the convection air circulation device circulates air to remove moisture from the surface of the battery plate grid 130. Additionally or alternatively, within the shared outer housing, the battery plate grid 130 may be exposed to a circulating convection air prior to and/or during a transfer of the battery plate grid 130 between the heated rollers 214 and 230.

Figure 3:
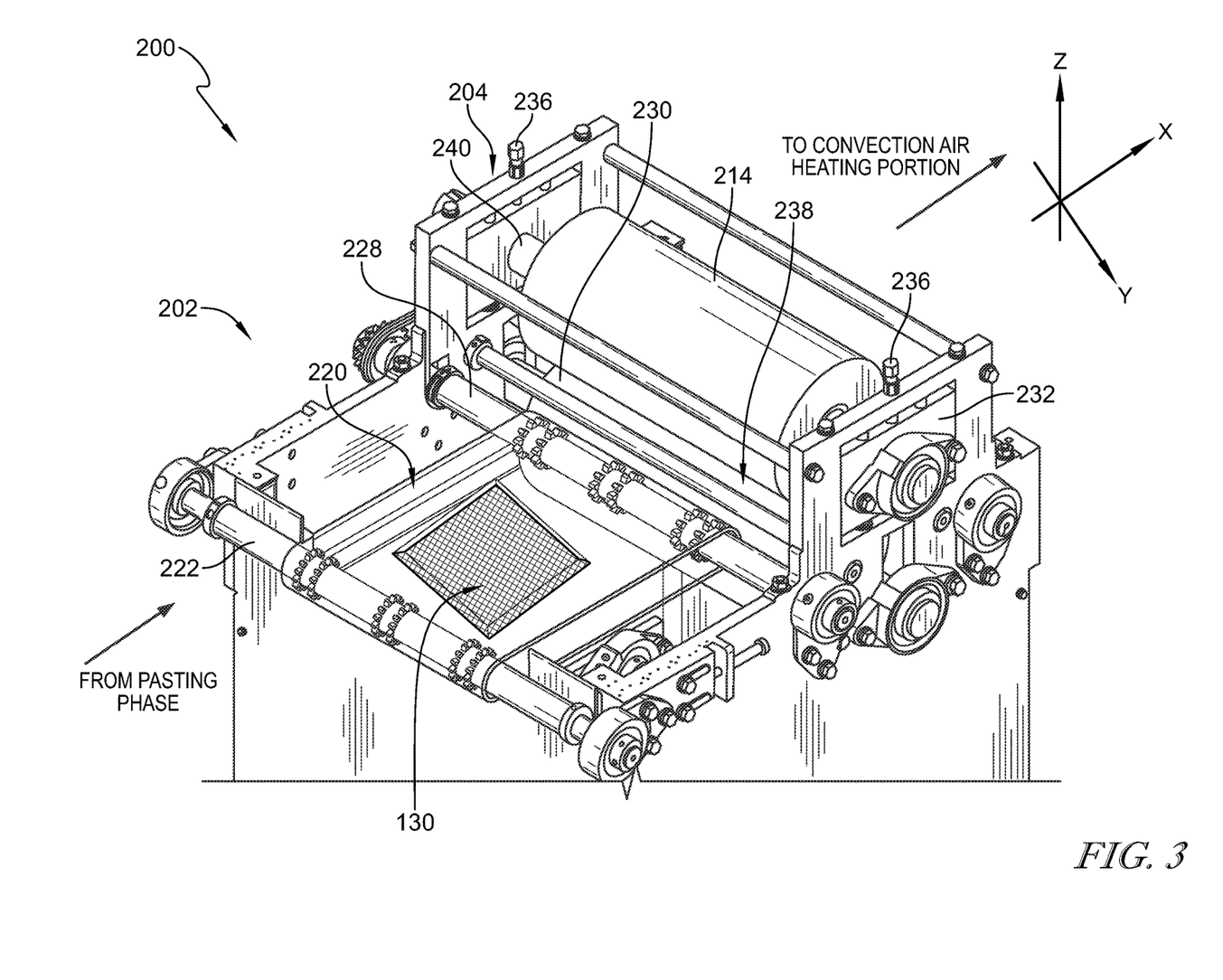
FIG. 3 is a diagram illustrating an exemplary implementation of a roller subsection of the battery plate grid dryer system of FIGS. 1 and 2.

FIG. 3 illustrates an example embodiment 200 of the heated roller portion 102 of the system 100. In one example, the heated roller portion 102 includes a first (upper) heated roller 214 and a second (lower) heated roller 230. The upper heated roller 214 may be disposed above the lower heated roller 230 with respect to z-axis. The heated rollers 214 and 230 may be of the same in size with one another, such as in length and diameter, and may be made of the same material. The heated rollers 214 and 230 may be configured to rotate at a same rotational speed and in opposite directions. For example, the first heated roller 214 may rotate counterclockwise and the second heated roller 230 may rotate clockwise. The heated rollers 214 and 230 may be spaced apart from one another along the z-axis defining a passage 238 and may be configured to movably transfer the battery plate grid 130 through the passage 238 toward the outlet 106b of the heated roller portion 102.

Figure 5:
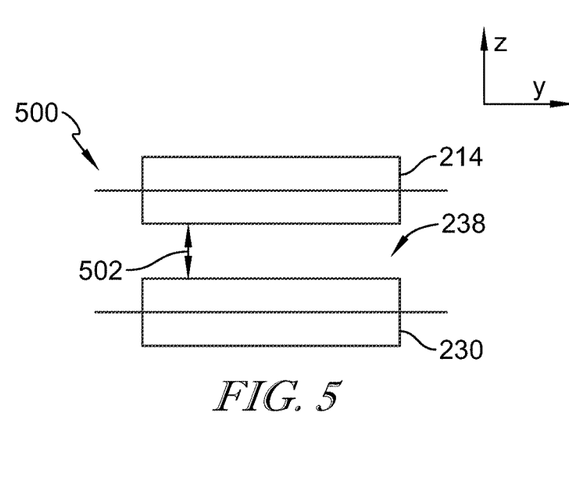
FIG. 5 is a diagram illustrating an example passage between the upper and lower heated rollers of the battery plate grid dryer system of FIGS. 1 and 2.

As illustrated in an example view 500 of FIG. 5, a height 502 of the passage 238 between the heated rollers 214 and 230 may comprise a size of a cross-section taken along a first plane along z-axis disposed perpendicular to a second plane of the first conveyor belt 150. The cross-section 502 of the passage 238 between the heated rollers 214 and 230 may be adjusted in size along the z-axis by adjusting relative positions of the heated rollers 214 and 230 with respect to one another. For example, the passage 238 between the heated rollers 214 and 230 may be adjusted in size along the z-axis by adjusting relative position of the upper heated roller 214 with respect to the lower heated roller 230, e.g., using a pair of position screws 236 to raise or lower plates 232 within which a retaining bar 240 of the upper heated roller 214 rests. While a manual adjustment of the heated rollers 214 and 230 is described, other electrical and electro-mechanical, directly and indirectly controlled adjustment systems are also contemplated.

The heating unit may be configured to have a predefined heat capacity, e.g., total effected heat of at least 10 kW, and may be configured to operate at a predefined temperature, such as, but not limited to, 250° F. or greater, 300° F. or greater, 600° F. or less, and between 250 and 600° F. Upon exiting the heated roller portion 102, the battery plate grid 130 enters the convection air heating portion 104. As described in reference to at least FIGS. 1 and 2, the convection air heating portion 104 may include the recirculation fan 132 configured to facilitate heat transfer to remove moisture from the battery plate grid 130.

The heated roller portion 102 of the system 100 includes a front section 202 and a roller section 204. The front section 202 may be disposed before, or "upstream" from, the roller section 204. The front section 202 may preserve operating efficiency of the system 100 by reducing the amount of heat generated by the heated rollers 214, 230 from escaping through the inlet 106a. Further, drawing air through the inlet 106a of the system 100, e.g., by the exhaust fan, may assist in creating negative pressure.

A first conveyor belt 220 may be similar to the first conveyor belt 150 described in reference to FIGS. 1 and 2. The first conveyor belt 220 may extend between a first (tail) pulley 222 and a second (head) pulley 228. Rotational force of the first and second pulleys 222 and 228 may cause the first conveyor belt 220 to move at a predefined rotation speed. The first convey belt 220 is configured to movably transfer the battery plate grid 130 disposed thereupon from the inlet 106a of the heated roller portion 102 toward the heated rollers 214 and 230 that, in turn, movably transfer the battery plate grid 130 (e.g., through the passage 238) to the second conveyor belt 152 for further processing.

The system is controllably adjustable so that the rotational speed of the rollers is balanced and tuned to provide a generally continuous flow with the speed of the conveyor moving through the dryer oven. These rotational speeds are balanced or tuned based on the type of material being processed through the oven, the desired output "dryness" of the paste within the grid, and the heating capacity of both the rollers and the drying oven. The method associated with the present invention uses all of these various characteristics to produce a processing method, the adjustments, characteristics and steps of which produce the desired end product, a grid plate with paste dried to a desired level of dryness while maintaining the quality of the materials at the output. The balancing of these parameters and characteristics also takes into account the reduced footprint of the present system and may require increased heat transfer while not unnecessarily expediting the transfer of moisture from the paste while still providing sufficient time to drive off moisture in a controlled manner.

The heated rollers 214 and 230 may be configured to contact or engage with and/or to slightly interfere with outer surface of the paste applied to the battery plate grid 130. In an example, the heated rollers 214 and 230 may interfere with the surface of the paste of the battery plate grid 130 by several thousands of an inch. In one example, the heated rollers 214 and 230 may interfere with the surface of the paste to a depth of less than 0.005 in. As another example, the heated rollers 214 and 230 may interfere with the surface of the paste to a depth of at least 0.001 in. By way of this interference, the heated rollers 214 and 230 may be configured to cause moisture or water within the paste to be gently squeezed out or otherwise displaced from within the paste toward the surface of the paste. Put another way, a combined pressure of the heated rollers 214 and 230 onto a pasted battery plate grid 130 may cause water or other moisture contained within a granular structure of the battery plate paste to be expressed or to collect on a surface of the paste.

To the extent that the resurfaced (expressed, collected, or pooled) water occurs about the surface of the paste of the battery plate grid 130 while the grid 130 is still traveling between the heated rollers 214 and 230, this water or moisture may be evaporated on the surface of the heated rollers 214 and 230. In some instances, the convection air heating portion 104 may be configured to circulate air to remove at least a portion of the moisture remaining on the surface of the paste of the battery plate grid 130 when the plate exits the heated roller portion 102 and/or enters the convection air heating portion 104.

Figure 6:
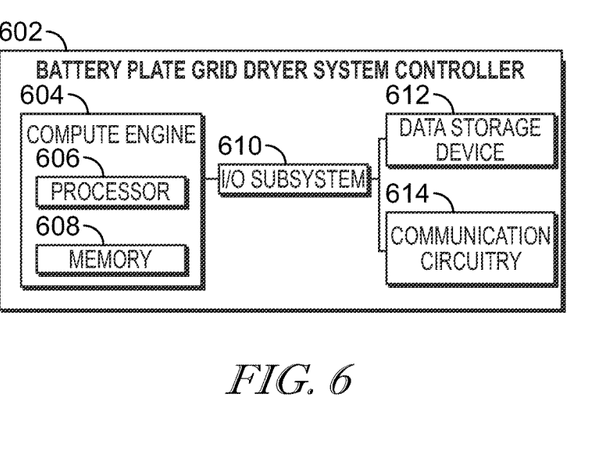
FIG. 6 is a block diagram illustrating a controller of the battery plate grid dryer system of FIGS. 1 and 2.

FIG. 6 illustrates an exemplary implementation 600 of a battery plate grid dryer controller 602 of the system 100. The controller 602 includes a compute engine 604, an input/output (I/O) subsystem 610, one or more data storage devices 612, and communication circuitry 614. It will be appreciated that the controller 602 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 604 may be embodied as any type of device or collection of devices capable of performing the described various compute functions. In some embodiments, the compute engine 604 may be embodied as a single device, such as an integrated circuit, an embedded system, a field-programmable gate array (FPGA), a system-on-a-chip (SOC), an application-specific integrated circuit (ASIC), reconfigurable hardware or hardware circuitry, or other specialized hardware to facilitate performance of the functions described herein. In some embodiments, the compute engine 604 may include, or may be embodied as, one or more processors 606 (i.e., one or more central processing units (CPUs)) and memory 608.

The processor 606 may be embodied as any type of processor capable of performing the described functions. For example, the processor 606 may be embodied as one or more single-core processors, one or more multi-core processors, a digital signal processor, a microcontroller, or other processor or processing/controlling circuit(s). In some embodiments, the processors 606 may be embodied as, include, or otherwise be coupled to an FPGA, an ASIC, reconfigurable hardware or hardware circuitry, or other specialized hardware to facilitate performance of the described functions.

The memory 608 may be embodied as any type of volatile (e.g., dynamic random access memory (DRAM)) or non-volatile memory or data storage capable of performing the described functions. It will be appreciated that the memory 608 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as DRAM or static random access memory (SRAM).

The compute engine 604 is communicatively coupled to other components of the controller 602 via the I/O subsystem 610, which may be embodied as circuitry and/or components to facilitate input/output operations with the processor 606, the memory 608, and other components of the controller 602. For example, the I/O subsystem 610 may be embodied as, or otherwise include, memory controller hubs, input/output control hubs, integrated sensor hubs, firmware devices, communication links (e.g., point-to-point links, bus links, wires, cables, light guides, and printed circuit board traces), and/or other components and subsystems to facilitate the input/output operations. In some embodiments, the I/O subsystem 610 may form a portion of a system-on-a-chip (SoC) and be incorporated, along with the compute engine 604 (e.g., the processor 606, and the memory 608) and/or other components of the controller 602, on a single integrated circuit chip.

The one or more data storage devices 612 may be embodied as any type of storage device(s) configured for short-term or long-term storage of data, such as, for example, memory devices and circuits, memory cards, hard disk drives, solid-state drives, or other data storage devices. Each data storage device 612 may include a system partition that stores data and firmware code for the data storage device 612. Each data storage device 612 may also include an operating system partition that stores data files and executables for an operating system.

The communication circuitry 614 may be embodied as any communication circuit, device, or collection thereof, capable of enabling communications between the controller 602 and other components of the system 100, such as the recirculating fan 312 and one or more sensors, e.g., temperature sensors, motion sensors, position/location sensors, and conveyor belt speed/velocity sensors, as well as any network communication enabling devices, such as a gateway, an access point, and other network switches/routers, to allow ingress/egress of network traffic. Accordingly, the communication circuitry 614 may be configured to use any one or more communication technologies (e.g., wireless or wired communication technologies) and associated protocols (e.g., Ethernet, Bluetooth®, Wi-Fi®, WiMAX, LTE, and 5G, as some examples) to effect such communication.

It should be appreciated that, in some embodiments, the communication circuitry 614 may include specialized circuitry, hardware, or combination thereof to perform control logic (e.g., hardware algorithms) for performing the functions described herein, including processing network packets (e.g., parse received network packets comprising sensor data, forward the network packets to the data storage device 612 and/or the compute engine 604 for further processing and analysis by the processor 606) and performing computational functions.

In some embodiments, performance of one or more of the functions of the described communication circuitry 614 may be performed by specialized circuitry, hardware, or combination thereof of the communication circuitry 614, which may be embodied as a system-on-a-chip (SoC) or otherwise form a portion of a SoC of the controller 602 (e.g., incorporated on a single integrated circuit chip along with the processor 606, the memory 608, and/or other components of the controller 602). Alternatively, the specialized circuitry, hardware, or combination thereof may be embodied as one or more discrete processing units of the controller 602, each of which may be capable of performing one or more of the described functions.

Figure 4:
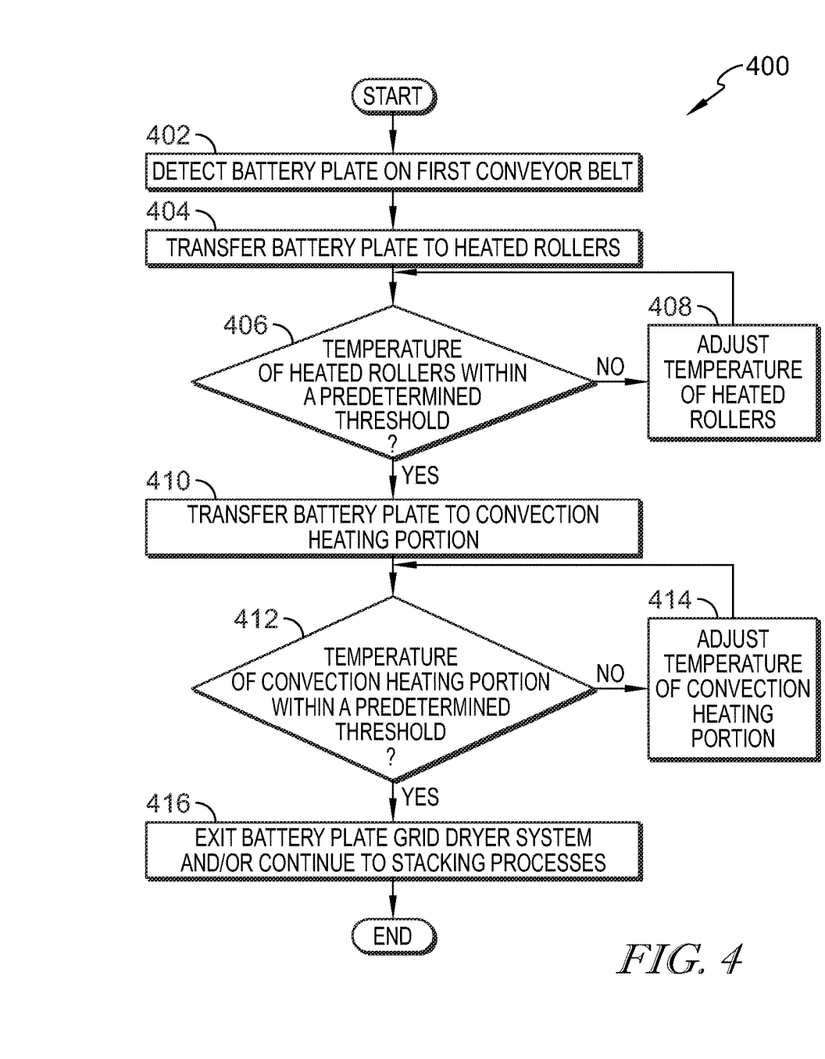
FIG. 4 is a process flow diagram illustrating an exemplary process for drying battery plate grids using a combination of roller and convection heating.

FIG. 4 illustrates an example process 400 for drying battery plates using a combination of controllably heated roller and controlled convection heating, such as the battery plate grid dryer system 100. One or more operations of the process 400 may be executed by the processor 606 of the battery plate grid dryer system controller 602. In other examples, the operations of the process 400 may be executed by way of additional or alternative methods, including continuous and fully-automated operations without intervention by computing or processing systems.

The process 400 may begin, at block 402, where the processor 606 detects the battery plate grid 130 on the first conveyor belt 150. At block 404, the processor 606 may cause the battery plate grid 130 to be transferred, using the first conveyor belt 150, to the heated rollers 214 and 230. The processor 606, at block 406, determines whether a temperature of the heated rollers 214 and 230 is within a predefined threshold of a temperature value, e.g., within 5° F. of a temperature value between 300° F. and 500° F. If the temperature threshold is not met, the processor 606 at block 408 causes the temperature of the heated rollers 214, 230 to be adjusted to be within a threshold value of a predefined temperature.

Once the transfer of the battery plate grid 130 through the heated rollers 214 and 230 has been completed, e.g., if the battery plate grid 130 has been received by the second conveyor belt 152, the processor 606, at block 410, causes the battery plate grid 130 to be movably transferred, using the second conveyor belt 152, to the convection air heating portion 104 of the drying process 400. In some examples, the transfer of the battery plate grid 130 from one stage to another and/or from one conveyor belt to another may be automatic, e.g., without intervention by the processor 606.

Once battery plate grid 130 is transferred to the convection air heating portion 104, the processor 606, at block 412, determines whether a temperature inside the convection air heating portion 104 is within a predefined threshold of a temperature value, e.g., within 5° F. of a temperature value between 250° F. and 600° F. If the temperature threshold is not met, the processor 606, at block 414, causes the temperature within the convection air heating portion 104 to be adjusted to be within a threshold value of a predefined temperature. In one example, the processor 606 may cause the temperature of the convection air heating portion 104 to change by adjusting a speed of the recirculation fan 132, i.e., increasing, decreasing, enabling, disabling, and/or varying a cadence and/or time period during which the fan 132 operates.

Once the transfer of the battery plate grid 130 through the convection air heating portion 104 has been completed, e.g., if the battery plate grid 130 has been transferred from the inlet 108*a* to the outlet 108*b* of the convection air heating portion 104, the processor 606, at block 416, causes the battery plate grid 130 to be movably transferred from the dryer system 100 toward one or more subsequent stages of the battery plate manufacturing and assembly. In some examples, the transfer of the battery plate grid 130 from the dryer system 100 toward one or more subsequent stages of the battery plate manufacturing and assembly may be automatic, e.g., without intervention by the processor 606. The process 400 may then end.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A system for drying a battery plate grid, the system comprising:
 a heated rollers portion directly connected to a convection oven portion, the heated rollers portion comprising:

at least one pair of heated rollers disposed adjacent to one another and spaced apart to define a passage therebetween; and a first conveyor belt arranged upstream from the heated rollers and a first portion of a second conveyor belt arranged downstream from the heated rollers, wherein the heated rollers are configured to receive the battery plate grid from the first conveyor belt and movably transfer the battery plate grid, via the passage, to the second conveyor belt, and wherein the heated rollers are disposed to interfere with a surface of a paste applied to a surface of the battery plate grid to remove moisture from the surface of the paste; and the convection oven portion comprising a convection oven configured to house a second portion of the second conveyor belt, wherein the second conveyor belt is arranged to movably transfer the battery plate grid from the outlet of the heated rollers portion to an inlet of the convection oven and along a length of the convection oven toward an outlet of the convection oven, and wherein the convection oven is configured to apply convection heat to the surface of the paste on the battery plate grid to remove moisture from the surface of the paste.

2. The system of claim 1, wherein a size of a cross-section of the passage may be adjusted by changing a position of at least one of the pair of heated rollers with respect to the other, such that the cross-section of the passage is sized to accommodate a thickness of the battery plate grid, with the paste applied to the surface of the battery plate grid, being movably transferred therethrough while ensuring that the heated rollers interfere with the surface of the paste on the surface of the battery plate grid.

3. The system of claim 1, wherein each of the heated rollers is heated using one of an electrical heating system and a thermal fluid circulated therethrough.

4. The system of claim 3, wherein outer surface of each of the heated rollers is heated to a temperature between 250 degrees and 500 degrees Fahrenheit.

5. The system of claim 3, wherein the temperature is greater than 500 degrees Fahrenheit.

6. The system of claim 1, wherein each of the heated rollers is disposed to interfere with the surface of paste of the battery plate grid by no more than 0.005 in.

7. The system of claim 1, wherein each of the heated rollers is disposed to interfere with the surface of the paste of the battery plate grid by at least 0.001 in.

8. The system of claim 1, wherein the heated rollers and the convection oven remove a predefined amount of moisture from a surface of the paste, such that a first amount of moisture on the surface of the paste when the battery plate grid is received by the first conveyor belt is greater than a second amount of moisture on the surface of the paste when the battery plate grid exits the outlet of the convection oven.

9. The system of claim 8, wherein a difference between the first amount of moisture and the second amount of moisture is at least 2%.

10. A method for drying a battery plate grid, the method comprising:

movably transferring, using a first conveyor belt, the battery plate grid toward at least one pair of heated rollers arranged adjacent to one another and spaced apart to define a passage therebetween, wherein a surface of the battery plate grid includes a paste applied to two sides of the battery plate grid, and wherein the two sides oppose one another;

movably transferring the battery plate grid, via the passage, to a second conveyor belt, wherein each of the heated rollers is disposed to interfere with a surface of the paste of the battery plate grid to remove moisture from the surface of the paste;

movably transferring, using the second conveyor belt, the battery plate grid to a convection oven directly connected to a portion that houses the heated rollers; and movably transferring, using the second conveyor belt, the battery plate grid from an inlet of the convection oven and along a length of the convection oven toward the outlet of the convection oven to expose the surface of the paste to convection heat to remove moisture from the surface of the paste.

11. The method of claim 10, wherein a size of a cross-section of the passage, taken along a first plane perpendicular to a second plane of the first conveyor belt, may be adjusted by changing a position of at least one of the pair of heated rollers with respect to the other, such that the cross-section of the passage is sized to accommodate a thickness of the battery plate being movably transferred therethrough while ensuring the heated rollers come in contact with the surface of the battery plate.

12. The method of claim 10, wherein each of the heated rollers is disposed to interfere with the surface of paste of the battery plate grid by no more than 0.005 in.

13. The method of claim 10, wherein each of the heated rollers is disposed to interfere with the surface of the paste of the battery plate grid by at least 0.001 in.

14. The method of claim 10, wherein the heated rollers and the convection oven remove a predefined amount of moisture from a surface of the paste, such that a first amount of moisture on the surface of the paste when the battery plate grid is received by the first conveyor belt is greater than a second amount of moisture on the surface of the paste when the battery plate grid exits the outlet of the convection oven.

15. The method of claim 14, wherein a difference between the first amount of moisture and a second amount of moisture is at least 2%.

16. The method of claim 10, wherein each of the heated rollers is heated using one of an electrical heating system and a thermal fluid circulated therethrough.

17. The method of claim 16, wherein outer surface of each of the heated rollers is heated to a temperature between 250 degrees and 500 degrees Fahrenheit (F).

18. A system for drying a battery plate grid, the system comprising:

a housing comprising:
  a first conveyor belt,
  a second conveyor belt spaced apart from the first conveyor belt,
  a pair of heated rollers disposed between the first and second conveyor belts, wherein the heated rollers are configured to receive the battery plate grid from the first conveyor belt and movably transfer the battery plate grid to the second conveyor belt, wherein the heated rollers are disposed to come in contact with a surface of paste applied to two opposing sides of the battery plate grid to remove moisture from the surface of the paste, and
  a convection air circulating device configured to, while the second conveyor belt movably transfers the pasted battery plate grid through interior of the housing, circulate air over the surface of the paste to remove moisture therefrom.

19. The system of claim 18, wherein the heated rollers and the convection air circulating device remove a predefined amount of moisture from a surface of the paste, such that a first amount of moisture on the surface of the paste when the battery plate grid is received by the first conveyor belt is greater than a second amount of moisture on the surface of the paste when the battery plate grid exits the outlet of the housing.

20. The system of claim 19, wherein the heated rollers and convection air circulating device remove at least 2% of the first amount of moisture on the surface of the paste.

* * * * *